(12) United States Patent
Yanagibashi et al.

(10) Patent No.: US 12,542,967 B2
(45) Date of Patent: Feb. 3, 2026

(54) ELECTRONIC DEVICE, CONTROL METHOD OF ELECTRONIC DEVICE, AND NON-TRANSITORY COMPUTER READABLE MEDIUM

(71) Applicant: CANON KABUSHIKI KAISHA, Tokyo (JP)

(72) Inventors: Ken Yanagibashi, Kanagawa (JP); Erika Ichihara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 135 days.

(21) Appl. No.: 18/536,560

(22) Filed: Dec. 12, 2023

(65) Prior Publication Data

US 2024/0205536 A1    Jun. 20, 2024

(30) Foreign Application Priority Data

Dec. 15, 2022   (JP) .................. 2022-200131

(51) Int. Cl.
*G06F 3/04845* (2022.01)
*H04N 5/262* (2006.01)
*H04N 23/60* (2023.01)
*H04N 23/63* (2023.01)
*H04N 23/66* (2023.01)

(52) U.S. Cl.
CPC .................. *H04N 23/64* (2023.01)

(58) Field of Classification Search
CPC .... H04N 23/64; H04N 23/634; H04N 23/635; H04N 23/66; H04N 23/88; H04N 5/2628; H04N 5/268; G06F 3/04845
See application file for complete search history.

(56) References Cited

U.S. PATENT DOCUMENTS 10,560,636 B1 * 2/2020 Hellerud .................. G06T 11/60
2006/0290792 A1 * 12/2006 Nikkanen ............ H04N 5/2628
  348/240.2
2022/0078357 A1   3/2022 Iwabuchi
2022/0210320 A1   6/2022 Osuka

FOREIGN PATENT DOCUMENTS

CN      115336282 A    11/2022
JP      2022-104241 A   7/2022

OTHER PUBLICATIONS

The above documents were cited in a British Search Report issued on Dec. 3, 2024 which is enclosed, that issued in the corresponding British Patent Application No. 2319175.2.

* cited by examiner

*Primary Examiner* — Ahmed A Berhan
(74) *Attorney, Agent, or Firm* — Cowan, Liebowitz & Latman, P.C.

(57) ABSTRACT

An electronic device according to the present invention, includes: an output interface configured to output an output image corresponding to a whole or a part of a region of an input image; a receiver configured to receive a tally signal corresponding to the output image; and at least one memory and at least one processor which function as a control unit configured to perform control to prohibit or restrict a setting change affecting the part of the region of the input image in response to reception of the tally signal in a case where the output image corresponds to the part of the region of the input image.

13 Claims, 4 Drawing Sheets

ELECTRONIC DEVICE, CONTROL METHOD OF ELECTRONIC DEVICE, AND NON-TRANSITORY COMPUTER READABLE MEDIUM

BACKGROUND OF THE INVENTION

Field of the Invention

The present invention relates to an electronic device, a control method of the electronic device, and a non-transitory computer readable medium. In particular, the present invention relates to a technique to set a part of the region of a captured image as a crop region and distribute an image corresponding to the crop region.

Description of the Related Art

A crop function that sets a part of the region of a captured image as a crop region and outputs an image corresponding to the crop region to the outside has been known. Using the crop function, it is possible to perform, for example, switching of an image to be output to the outside from an image (whole image) corresponding to the whole of the region of a captured image to an image (crop image) corresponding to a crop region. The position and size of the crop region may be changed according to instructions (operation) from a user.

In a system that distributes images, at least one electronic device having a crop function is, for example, connected to a switcher. According to instructions from a user, an image to be output (an image to be distributed) from the switcher is appropriately switched among a plurality of images having been input to the switcher. Hereinafter, an image being output from the switcher as an on-air image will be described as a "PGM output image," and an image to be next output as an on-air image will be described as a "NEXT output image."

The switcher transmits a tally signal to an electronic device outputting a PGM output image. Then, the electronic device turns on a tally when receiving the tally signal transmitted from the switcher. As a result, a user of the electronic device is allowed to grasp whether an image output from the electronic device is a PGM output image. When an image output from the switcher is switched, a tally of an electronic device that has output an image before the switching is turned off and a tally of an electronic device outputting an image after the switching is turned on.

It is disclosed in Japanese Patent Application Laid-open No. 2022-104241 that a determination is made as to which of a plurality of different patterns an operating member to be set in a locked state corresponds, and that the operating member is set in the locked state on the basis of the determined pattern.

However, in a conventional system that distributes images, there is a possibility that a wrong operation affecting a crop image being output as a PGM output image occurs. For example, in a situation in which a user performs an operation affecting a crop image, the crop image may be possibly selected as a PGM output image at a timing unintended by the user according to instructions from another user. In such a case, an operation (wrong operation) affecting the crop image is performed even after the crop image has been output as the PGM output image. The wrong operation affecting the crop image being output as the PGM output image may lead to a broadcast accident. The problem is not addressed by the technique disclosed in Japanese Patent Application Laid-open No. 2022-104241.

SUMMARY OF THE INVENTION

The present invention provides a technique to make it possible to prevent a wrong operation affecting a crop image (a part of the region of an input image) being output as a PGM output image.

An electronic device according to the present invention, includes: an output interface configured to output an output image corresponding to a whole or a part of a region of an input image; a receiver configured to receive a tally signal corresponding to the output image; and at least one memory and at least one processor which function as a control unit configured to perform control to prohibit or restrict a setting change affecting the part of the region of the input image in response to reception of the tally signal in a case where the output image corresponds to the part of the region of the input image.

Further features of the present invention will become apparent from the following description of embodiments with reference to the attached drawings.

DESCRIPTION OF THE EMBODIMENTS

First Embodiment

Hereinafter, a first embodiment according to the present invention will be described with reference to the drawings.

In the first embodiment, a part of the region of a captured image will be set as a crop region. An image corresponding to the whole of the region of a captured image will be described as the "whole image," and an image corresponding to a crop region will be described as a "crop image." An image being output from an external device such as a switcher will be described as a "PGM output image," and an image to be next output from the external device will be described as a "NEXT output image."

In the first embodiment, a digital video camera 10 (hereinafter described as a "camera 10") capable of receiving a tally signal corresponding to a PGM output image from an external device and preventing a wrong operation affecting a crop image being output as the PGM output image will be described.

Figure 1:
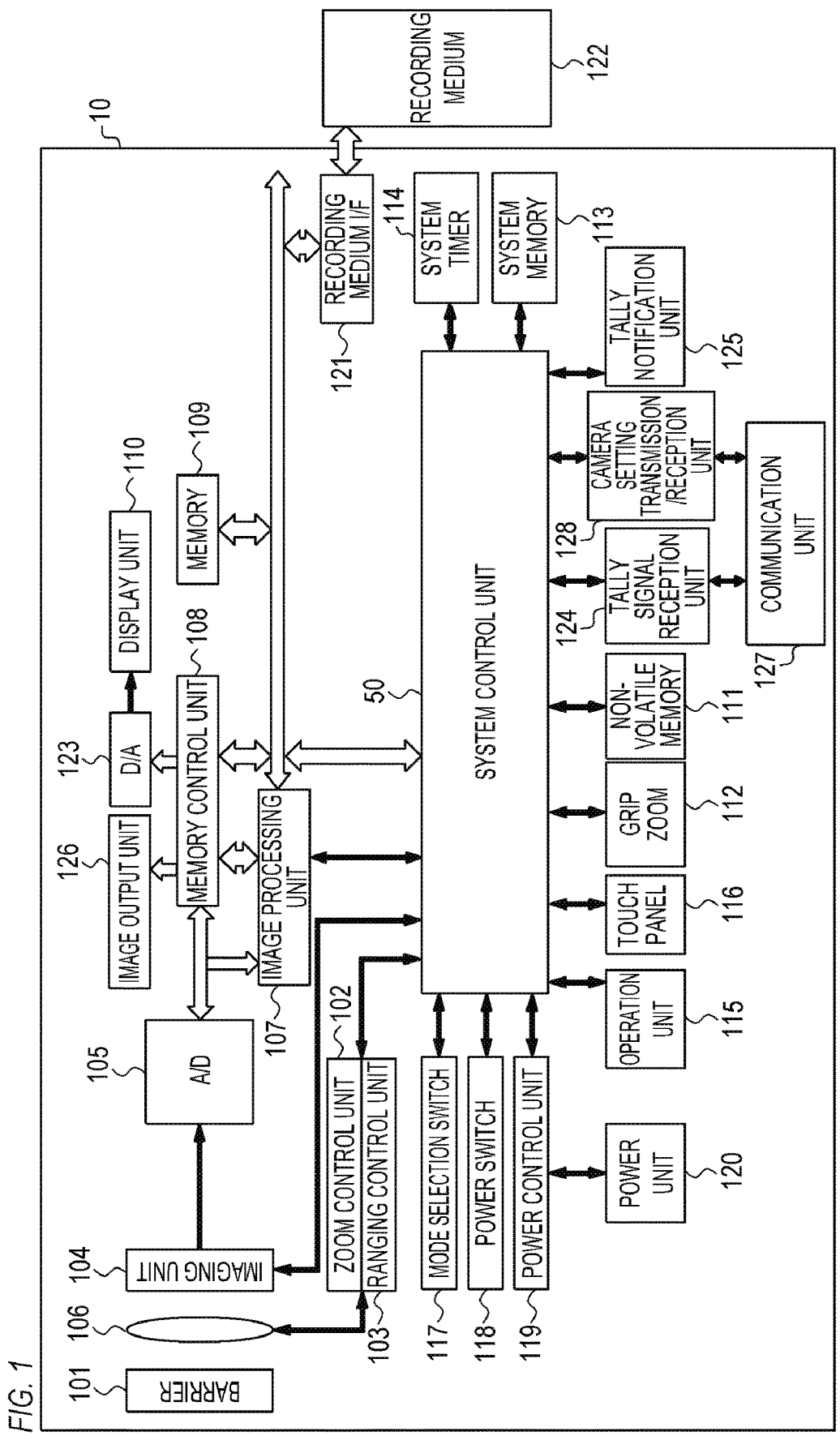
FIG. 1 is a block diagram showing the configuration of a camera according to a first embodiment.

FIG. 1 is a block diagram showing the configuration of the camera 10.

A photographing lens 106 is a lens group including a zoom lens and a focus lens. The zoom lens is a lens used to change a zoom magnification by changing a focal distance. The zoom lens is controlled by a zoom control unit 102. The focus lens is a lens used to adjust a focus. The focus lens is controlled by a ranging control unit 103.

An imaging unit 104 is an imaging element (image sensor) composed of a CCD or CMOS element or the like that converts an optical image into an electric signal. An A/D convertor 105 converts an analog signal output from the imaging unit 104 into a digital signal. A barrier 101 covers an imaging system (a portion including the photographing lens 106 or the like) of the camera 10 to prevent stain and damage of the imaging system.

An image processing unit 107 performs prescribed image processing (for example, resize processing such as pixel interpolation and contraction, color conversion processing, or the like) on image data from the A/D convertor 105 or image data from a memory control unit 108. The image processing unit 107 performs prescribed computation processing using captured-image data, and a system control unit 50 performs exposure control and ranging control on the basis of a computation result obtained by the image processing unit 107. As a result, automatic focus (AF) processing of a through-the-lens (TTL) system, automatic exposure (AE) processing, and electronic flash pre-emission (EF) processing are performed. Moreover, the image processing unit 107 performs prescribed computation processing using captured-image data, and performs automatic white balance (AWB) processing of a TTL system on the basis of an obtained computation result.

Image data from the A/D convertor 105 is written into a memory 109 via the image processing unit 107 and a memory control unit 108 or via the memory control unit 108. In the memory 109, image data that has been obtained by the imaging unit 104 and converted into digital data by the A/D convertor 105 is, for example, stored for various processing. The memory 109 has storage capacity enough to store a prescribed number of still images or moving images and sounds for a prescribed period of time. The memory 109 serves also as a memory (video memory) for displaying images, and image data to be displayed on a display unit 110 is also stored in the memory 109. On the display unit 110, image data that has been obtained by the imaging unit 104 and converted into digital data by the A/D convertor 105 is, for example, displayed. Image data that has been read from a recording medium 122, on-screen display (OSD) data of a frame or the like showing a crop region, or the like may be displayed on the display unit 110.

A D/A convertor 123 converts image data for display stored in the memory 109 into an analog signal, and supplies the converted signal to the display unit 110. Accordingly, image data for display written into the memory 109 is displayed on the display unit 110 via the D/A convertor 123. The display unit 110 is a display such as a liquid-crystal display (LCD), and performs display according to an analog signal from the D/A convertor 123. A digital signal that has been A/D-converted by the A/D convertor 105 and accumulated in the memory 109 is converted into an analog signal by the D/A convertor 123, and sequentially transferred to and displayed on the display unit 110. As a result, a live-view image is displayed, and a function is realized as an electronic viewfinder. The display unit 110 may also be an organic electroluminescence (EL) display or the like.

An image output unit 126 reads image data accumulated in the memory 109 via the memory control unit 108, converts the read image data into an image signal, and outputs the image signal to the outside. In the first embodiment, the image output unit 126 has a serial digital interface (SDI) terminal and a high-definition multimedia interface (HDMI)™ terminal. The image output unit 126 converts the format of an image into a format corresponding to the SDI terminal, and outputs the image from the SDI terminal. Alternatively, the image output unit 126 converts the format of an image into a format corresponding to the HDMI terminal, and outputs the image from the HDMI terminal. The numbers of the terminals are not particularly limited. The image output unit 126 may also extract (cut and crop) a crop region from an image, and output image data of the crop region.

A non-volatile memory 111 is electrically-erasable/recordable memory, and an EEPROM or the like is, for example, used as such. On the non-volatile memory 111, a constant for operating the system control unit 50, a program, or the like is stored. The program is a program used to run various flowcharts that will be described later.

The system control unit 50 controls the whole camera 10. The system control unit 50 realizes respective processing that will be described later by running a program stored in the non-volatile memory 111. The system control unit 50 also performs display control by controlling the memory 109, the D/A convertor 123, the display unit 110, or the like.

A system memory 113 is, for example, a RAM. In the system memory 113, a constant for operating the system control unit 50, a variable, a program read from the non-volatile memory 111, or the like is stored. A system timer 114 is a clocking unit that measures time used in various control or time of an embedded clock.

An operation unit 115 is used to input instructions to perform various operations (various instructions from a user) to the system control unit 50. The system control unit 50 performs various processing according to instructions input by the user via the operation unit 115. The operation unit 115 includes various buttons such as a menu button, a cancel button, four direction keys (an upward key, a downward key, a leftward key, and a rightward key), a SET key, and an AF/MF key. A menu screen enabling various settings is displayed on the display unit 110, for example, when the menu button is pressed. The user may intuitively perform the various settings using the menu screen displayed on the display unit 110, the four direction keys, and the SET key. The user may set at least one crop region with respect to image data accumulated in the memory 109, and separately change the position and size of at least one crop region. The user may switch a region of an image to be output from the image output unit 126.

A touch panel 116 is a touch sensor that detects various touch operations on the display surface of the display unit 110 (the operation surface of the touch panel 116). The touch panel 116 and the display unit 110 may be integrally configured. For example, the touch panel 116 is configured to have transparency to such an extent that the display of the display unit 110 is not disturbed, and is attached to an upper layer of the display surface of the display unit 110. Further, input coordinates in the touch panel 116 and display coordinates on the display surface of the display unit 110 are associated with each other. As a result, a graphical user interface (GUI) making the user feel as if he/she were capable of directly operating a screen displayed on the display unit 110 may be provided.

A mode selection switch 117 switches an operation mode of the system control unit 50 to any of a moving-image recording mode, a reproduction mode, or the like.

A power switch 118 is a pressing button used to switch between ON and OFF states of the power of the camera 10.

A grip zoom 112 is a see-saw-type pressing button. The system control unit 50 detects a pressing amount (operating amount) of the grip zoom 112 when the grip zoom 112 is pressed from a reference position, and changes a zoom magnification at a zoom speed corresponding to the detected pressing amount. The system control unit 50 changes a zoom magnification by changing a position of the photographing lens 106 (zoom lens) via the zoom control unit 102. In the first embodiment, the output voltage of the grip zoom 112 changes by a larger amount as a pressing amount of the grip zoom 112 is larger. Accordingly, the system control unit 50 is capable of detecting a pressing amount of the grip zoom 112 by detecting the output voltage of the grip zoom 112.

A power control unit 119 is composed of a battery detection circuit, a DC-DC convertor, a switch circuit that switches a block to be energized, or the like, and detects the presence or absence of the installation of a battery, the type of a battery, a remaining amount of a battery, or the like. The power control unit 119 controls the DC-DC convertor on the basis of the detection results and instructions from the system control unit 50, and supplies a required voltage to respective units including the recording medium 122 for a required period. A power unit 120 is composed of a primary battery such as an alkali battery and a lithium battery, a secondary battery such as an NiCd battery, an NiNM battery, and an Li battery, an AC adapter, or the like.

A recording medium I/F 121 is an interface with the recording medium 122 such as a memory card and a hard disk. The recording medium 122 is a recording medium used to record captured image data, and composed of a semiconductor memory, a magnetic disk, or the like.

A tally signal reception unit 124 receives a tally signal from the outside via a communication unit 127. In the first embodiment, a tally signal corresponds to (shows) any of a plurality of states of an output image (an image being output from the image output unit 126) such as a PGM output image and a NEXT output image. The tally signal reception unit 124 is capable of receiving the same number of tally signals as terminals provided in the image output unit 126. In the first embodiment, the tally signal reception unit 124 receives a tally signal from an external device such as a switcher via the communication unit 127. Note that an external device that outputs a tally signal and a method for receiving the tally signal are not particularly limited so long as a terminal (output image) and a state corresponding to the tally signal are discriminable. For example, with the provision of a plurality of contact input terminals that receive the binary voltage of ON and OFF from the outside in the camera 10, at least one tally signal may be received using the plurality of contact input terminals.

A camera setting transmission/reception unit 128 transmits/receives setting information on the camera 10 to/from the outside via the communication unit 127. As a result, it is possible to perform various settings without the operation unit 115.

The communication unit 127 performs communication with the outside. In the first embodiment, the communication unit 127 performs wired communication with an external device connected to the camera 10 using a cable. Note that the communication unit 127 may perform wireless communication using an antenna.

A tally notification unit 125 lights up when a tally signal is received by the tally signal reception unit 124. For example, the tally notification unit 125 has an LED light, and turns on the LED light when a tally signal is received by the tally signal reception unit 124. The tally notification unit 125 may light up so as to enable discrimination of a terminal (output image) and a state corresponding to a received tally signal.

Figure 2:
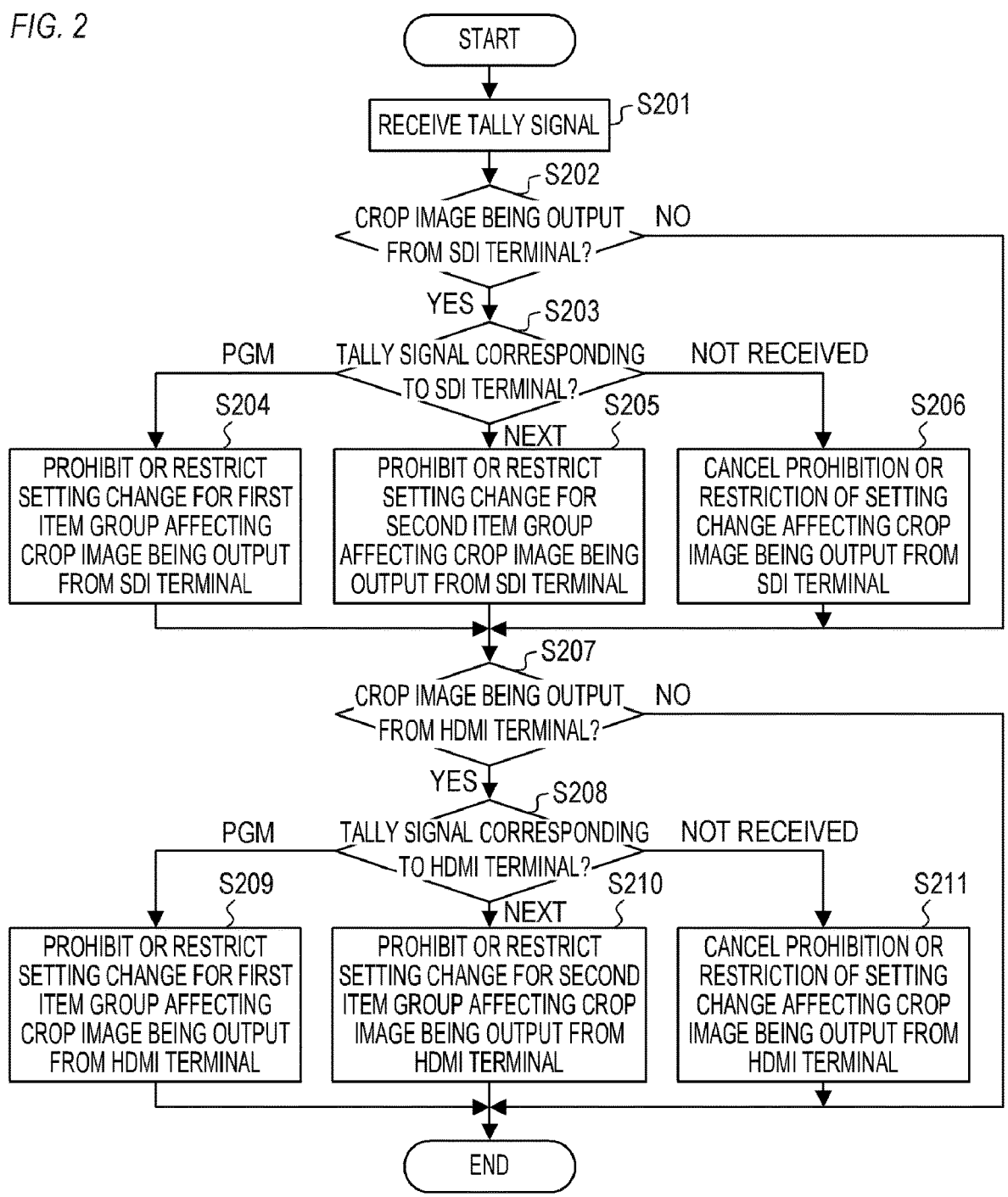
FIG. 2 is a flowchart showing the processing of the camera according to the first embodiment.

FIG. 2 is a flowchart showing the processing of the camera 10. The processing of FIG. 2 is realized when the system control unit 50 develops a program stored in the non-volatile memory 111 into the system memory 113 and runs the developed program. The processing of FIG. 2 is repeatedly performed at a prescribed cycle after the power of the camera 10 is turned on, for example, when a user operates the power switch 118.

Note that the system control unit 50 has acquired a captured image (input image) from the imaging unit 104 (specifically, the A/D convertor 105), the recording medium 122, or the like and set a crop region with respect to the captured image according to instructions from the user before starting the processing of FIG. 2. Then, the system control unit 50 has displayed the captured image (whole image) and a frame showing the crop region on the display unit 110. The system control unit 50 starts the processing of FIG. 2 with the captured image and the frame displayed on the display unit 110.

In S201, the system control unit 50 controls the tally signal reception unit 124 to receive a tally signal.

In S202, the system control unit 50 determines whether an image (SDI output image) being output from an SDI terminal is a crop image. When the SDI output image is the crop image, the processing proceeds to S203. Otherwise (when the SDI output image is the whole image or when an image is not being output from the SDI terminal), the processing proceeds to S207.

In S203, the system control unit 50 determines (confirms) the tally signal corresponding to the SDI terminal (SDI output image). When the tally signal corresponding to a PGM output image (the tally signal showing that the SDI output image is the PGM output image) has been received, the processing proceeds to S204. When the tally signal corresponding to a NEXT output image (the tally signal showing that the SDI output image is the NEXT output image) has been received, the processing proceeds to S205. When the tally signal corresponding to the SDI terminal (SDI output image) has not been received, the processing proceeds to S206.

In S204, the system control unit 50 prohibits or restricts a setting change affecting the crop image (a part of the region of the input image) being output as the SDI output image. The system control unit 50 performs control to prohibit or restrict a setting change for a first item group including at least one item. For example, the system control unit 50 prohibits a change in the position and size of the crop region output from the SDI terminal, or prohibits movement of an AF position to the outside of the crop region. The system control unit 50 may also prohibit execution of color conversion processing for the crop region output from the SDI terminal, switching of the crop region output from the SDI terminal, or the like. The system control unit 50 may also restrict a speed for changing the size of the crop region to a speed not more than a prescribed speed. It is possible to change the size of the crop region using the grip zoom 112. The speed for changing the size of the crop region may be determined according to an operating amount (pressing amount) of the grip zoom 112. In this case, the system control unit 50 may change the corresponding relationship between the operating amount of the grip zoom 112 and the speed for changing the size of the crop region, or may prohibit an operation on the grip zoom 112 beyond at least a prescribed operating amount. As a result, it is possible to restrict the speed for changing the size of the crop region to a speed not more than the prescribed speed. The first item group for which the setting change is prohibited or restricted may include items affecting the whole image (the whole of the region of the input image), besides the items affecting the crop image being output as the SDI output image (the items as described above). For example, the system control unit 50 may prohibit or restrict the PTZ (pan, tilt, and zoom) operation of the camera 10, a change in the setting of white balance, or the like.

In S205 as well, the system control unit 50 prohibits or restricts a setting change affecting the crop image (a part of the region of the input image) being output as the SDI output image. The system control unit 50 performs control to prohibit or restrict a setting change for a second item group including at least one item. However, the second item group for which the setting change is prohibited or restricted in S205 is different from the first item group for which the setting change is prohibited or restricted in S204. An item group for which a setting change is prohibited or restricted is not particularly limited. However, in the first embodiment, the second item group for which the setting change is prohibited or restricted in S205 is narrower than the first item group for which the setting change is prohibited or restricted in S204. For example, in S204, the system control unit 50 prohibits the movement of the AF position to the outside of the crop region output from the SDI terminal and the change in the position and size of the crop region. On the other hand, in S205, the system control unit 50 does not prohibit the movement of the AF position to the outside of the crop region output from the SDI terminal, but prohibits the change in the position and size of the crop region.

Note that the system control unit 50 may provide prescribed notification when the received tally signal corresponds to a specific state. For example, in S205, the system control unit 50 may not prohibit or restrict the setting change affecting the crop image being output as the SDI output image but may display a prescribed alert message on the display unit 110 in response to indication of the setting change by the user.

In S206, the system control unit 50 cancels the prohibition and restriction of the setting change (the prohibition and restriction set in S204 or S205) affecting the crop image being output as the SDI output image. There is a case that the crop image being output as the SDI output image is switched from the PGM output image to the NEXT output image. In this case, the system control unit 50 cancels the limitation and restriction of the setting change for an item for which the setting change is not prohibited or restricted in S205 among the at least one item for which the setting change is prohibited or restricted in S204. There is also a case that the crop image being output as the SDI output image is switched from the NEXT output image to the PGM output image. In this case, the system control unit 50 cancels the prohibition and restriction of the setting change for an item for which the setting change is not prohibited or restricted in S204 among the at least one item for which the setting change is prohibited or restricted in S205.

When the SDI output image is the whole image, both the processing of S204 and the processing of S205 are not performed. Accordingly, when the SDI output image is the whole image, the system control unit 50 does not prohibit or restrict the setting change affecting the crop image even when the tally signal is received.

In S207, the system control unit 50 determines whether an image (HDMI output image) being output from an HDMI terminal is a crop image. When the HDMI output image is the crop image, the processing proceeds to S208. Otherwise (when the HDMI output image is the whole image or when an image is not being output from the HDMI terminal), the processing of FIG. 2 ends.

In S208, the system control unit 50 determines (confirms) the tally signal corresponding to the HDMI terminal (HDMI output image). When the tally signal corresponding to a PGM output image (the tally signal showing that the HDMI output image is the PGM output image) has been received, the processing proceeds to S209. When the tally signal corresponding to a NEXT output image (the tally signal showing that the HDMI output image is a NEXT output image) has been received, the processing proceeds to S210. When the tally signal corresponding to the HDMI terminal (HDMI output image) has not been received, the processing proceeds to S211.

In S209, the system control unit 50 prohibits or restricts a setting change affecting the crop image (a part of the region of the input image) being output as the HDMI output image. The system control unit 50 performs control to prohibit or restrict a setting change for a first item group including at least one item. For example, the system control unit 50 prohibits a change in the position and size of the crop region output from the HDMI terminal, or prohibits movement of an AF position to the outside of the crop region. The system control unit 50 may also prohibit execution of color conversion processing for the crop region output from the HDMI terminal, switching of the crop region output from the HDMI terminal, or the like. The system control unit 50 may also restrict a speed for changing the size of the crop region to a speed not more than a prescribed speed. It is possible to change the size of the crop region using the grip zoom 112. The speed for changing the size of the crop region may be determined according to an operating amount (pressing amount) of the grip zoom 112. In this case, the system control unit 50 may change the corresponding relationship between the operating amount of the grip zoom 112 and the speed for changing the size of the crop region, or may prohibit an operation on the grip zoom 112 beyond at least a prescribed operating amount. As a result, it is possible to restrict the speed for changing the size of the crop region to a speed not more than the prescribed speed. The first item group for which the setting change is prohibited or restricted may include items affecting the whole image (the whole of the region of the input image), besides the items affecting the crop image being output as the HDMI output image (the items as described above). For example, the system control unit 50 may prohibit or restrict the PTZ (pan, tilt, and zoom) operation of the camera 10, a change in the setting of white balance, or the like.

In S210 as well, the system control unit 50 prohibits or restricts a setting change affecting the crop image (a part of the region of the input image) being output as the HDMI output image. The system control unit 50 performs control to prohibit or restrict a setting change for a second item group including at least one item. However, the second item group for which the setting change is prohibited or restricted in S210 is different from the first item group for which the setting change is prohibited or restricted in S209. An item group for which a setting change is prohibited or restricted is not particularly limited. However, in the first embodiment, the second item group for which the setting change is prohibited or restricted in S210 is narrower than the first item group for which the setting change is prohibited or restricted in S209. For example, in S209, the system control unit 50 prohibits the movement of the AF position to the outside of the crop region output from the HDMI terminal and the change in the position and size of the crop region. On the other hand, in S210, the system control unit 50 does not prohibit the movement of the AF position to the outside of the crop region output from the HDMI terminal, but prohibits the change in the position and size of the crop region.

Note that the system control unit 50 may provide prescribed notification when the received tally signal corresponds to a specific state as described above. For example, in S210, the system control unit 50 may not prohibit or restrict the setting change affecting the crop image being output as the HDMI output image but may display a prescribed alert message on the display unit 110 in response to indication of the setting change by the user.

In S211, the system control unit 50 cancels the prohibition and restriction of the setting change (the prohibition and restriction set in S209 or S210) affecting the crop image being output as the HDMI output image. There is a case that the crop image being output as the HDMI output image is switched from the PGM output image to the NEXT output image. In this case, the system control unit 50 cancels the limitation and restriction of the setting change for an item for which the setting change is not prohibited or restricted in S210 among the at least one item for which the setting change is prohibited or restricted in S209. There is also a case that the crop image being output as the HDMI output image is switched from the NEXT output image to the PGM output image. In this case, the system control unit 50 cancels the prohibition and restriction of the setting change for an item for which the setting change is not prohibited or restricted in S209 among the at least one item for which the setting change is prohibited or restricted in S210.

When the HDMI output image is the whole image, both the processing of S209 and the processing of S210 are not performed. Accordingly, when the HDMI output image is the whole image, the system control unit 50 does not prohibit or restrict the setting change affecting the crop image even when the tally signal is received.

As described above, a setting change affecting a crop image (a part of the region of an input image) is prohibited or restricted in response to reception of a tally signal corresponding to an output image when the output image is the crop image according to the first embodiment. As a result, it is possible to prevent a wrong operation affecting a crop image (a part of the region of an input image) being output as a PGM output image.

Note that the system control unit 50 is capable of setting a plurality of crop regions with respect to an input image and outputting a plurality of output images corresponding to the plurality of crop regions, respectively, from the image output unit 126 to the outside in the first embodiment. When a plurality of output images are output to the outside, the tally signal reception unit 124 receives a tally signal for at least any of the plurality of output images. Then, the system control unit 50 performs control to prohibit or restrict a setting change affecting a crop region corresponding to the output image for which the tally signal has been received among the plurality of crop regions.

In the first embodiment, different crop images are output from different terminals. However, the same crop image may be output from different terminals. In this case, different tally signals (a tally signal corresponding to a PGM output image and a tally signal corresponding to a NEXT output image) are received for the same crop image in some cases. However, processing for the tally signal corresponding to the PGM output image is only required to be performed.

Items for which a setting change is prohibited or restricted in response to reception of a tally signal may or may not be set in advance by a manufacturer or the like. For example, the system control unit 50 may set, according to instructions from the user, items for which a setting change is prohibited or restricted in response to reception of a tally signal.

The system control unit 50 may provide prescribed notification when performing control to prohibit or restrict a setting change. For example, the system control unit 50 may notify the user of the fact that control to prohibit or restrict a setting change has been performed by displaying an icon on the display unit 110 or by changing the mode of a frame showing a crop region.

Second Embodiment

Hereinafter, a second embodiment according to the present invention will be described with reference to the drawings. Note that the descriptions of the same points as those of the first embodiment (for example, the same configurations and processing as those of the first embodiment) will be omitted, and points different from those of the first embodiment will be described below.

In the second embodiment, a controller 3000 of a camera (a first external device) will be described. The controller 3000 is capable of receiving from an external device (a second external device) a tally signal corresponding to an image having been output from the camera to the second external device such as a switcher and preventing a wrong operation affecting a crop image being output as a PGM output image. Note that an image may be output to an external device such as a switcher from the controller 3000, or be output from the camera directly to the switcher.

Figure 3:
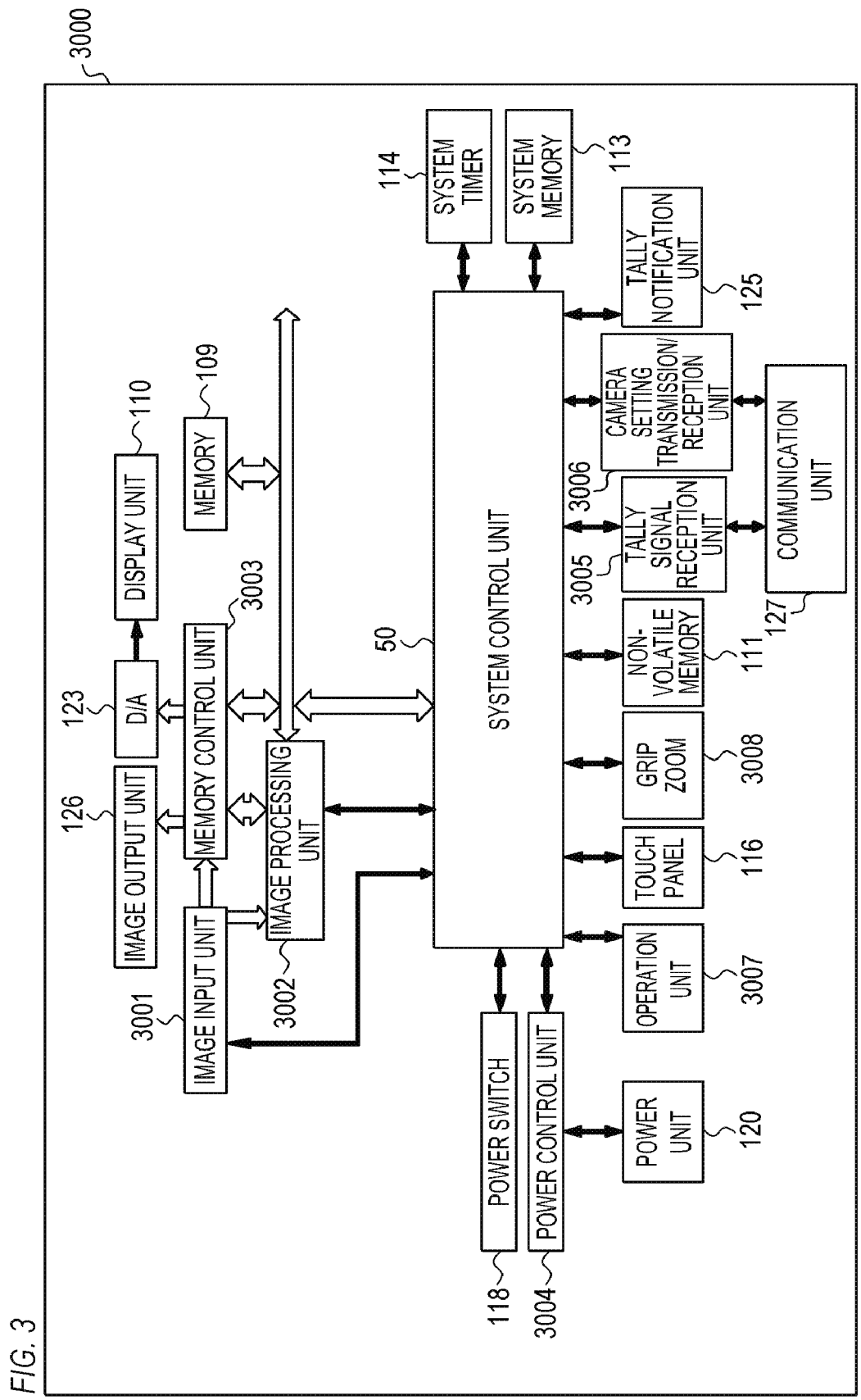
FIG. 3 is a block diagram showing the configuration of a controller according to a second embodiment.

FIG. 3 is a block diagram showing an example of the configuration of the controller 3000. In FIG. 3, the same constituting elements as those of the first embodiment (FIG. 1) are denoted by the same symbols as those of the first embodiment.

An image input unit 3001 receives an image signal from the outside. In the second embodiment, the camera has two SDI terminals and one HDMI terminal, the image input unit 3001 has an SDI terminal, and the SDI terminal of the image input unit 3001 is connected to the SDI terminals of the camera. Further, the image input unit 3001 receives (acquires) the whole image from the camera.

An image processing unit 3002 performs prescribed image processing (resize processing such as pixel interpolation and contraction, color conversion processing, or the like) on image data from the image input unit 3001 or image data from a memory control unit 3003.

Image data from the image input unit 3001 is written into a memory 109 via the image processing unit 3002 and the memory control unit 3003 or via the memory control unit 3003.

An operation unit 3007 is used to input instructions to perform various operations (various instructions from a user) to a system control unit 50. The system control unit 50 performs various processing according to instructions input by the user via the operation unit 3007. The operation unit 3007 includes various buttons such as a menu button, a cancel button, four direction keys (an upward key, a downward key, a leftward key, and a rightward key), and a SET key. A menu screen enabling various settings is displayed on a display unit 110, for example, when a menu button is pressed. The user may intuitively perform the various settings using the menu screen displayed on the display unit 110, the four direction keys, and the SET key. The user may set at least one crop region with respect to image data accumulated in the memory 109, and separately change the position and size of at least one crop region. The set position and size of a crop region are transmitted from a camera setting transmission/reception unit 3006 that will be described later to the camera. Besides the position and size of a crop region, setting information on the camera may be transmitted/received to perform various settings on the camera.

A grip zoom 3008 is a see-saw-type pressing button. The system control unit 50 detects a pressing amount (operating amount) of the grip zoom 3008 when the grip zoom 3008 is pressed from a reference position, and changes a zoom magnification of the camera at a zoom speed corresponding to the detected pressing amount. The system control unit 50 changes the zoom magnification of the camera by transmitting setting information from the camera setting transmission/reception unit 3006 to the camera. In the second embodiment, the output voltage of the grip zoom 3008 changes by a larger amount as a pressing amount of the grip zoom 3008 is larger. Accordingly, the system control unit 50 is capable of detecting a pressing amount of the grip zoom 3008 by detecting the output voltage of the grip zoom 3008.

A power control unit 3004 is composed of a battery detection circuit, a DC-DC convertor, a switch circuit that switches a block to be energized, or the like, and detects the presence or absence of the installation of a battery, the type of a battery, a remaining amount of a battery, or the like.

A tally signal reception unit 3005 receives a tally signal from the outside via a communication unit 127. In the second embodiment, a tally signal corresponds to (shows) any of a plurality of states of the output image of the camera such as a PGM output image and a NEXT output image. The tally signal reception unit 3005 is capable of receiving the same number of tally signals as images output from the camera. In the second embodiment, the tally signal reception unit 3005 receives a tally signal from an external device such as a switcher via the communication unit 127. Note that an external device that outputs a tally signal and a method for receiving the tally signal are not particularly limited so long as an output image and a state corresponding to the tally signal are discriminable.

The camera setting transmission/reception unit 3006 transmits/receives setting information on the camera via the communication unit 127. For example, it is possible to transmit/receive the position and size of a crop region, selection information on an image output from the camera, the zoom speed of the camera, setting information on an AF, or the like.

Figure 4:
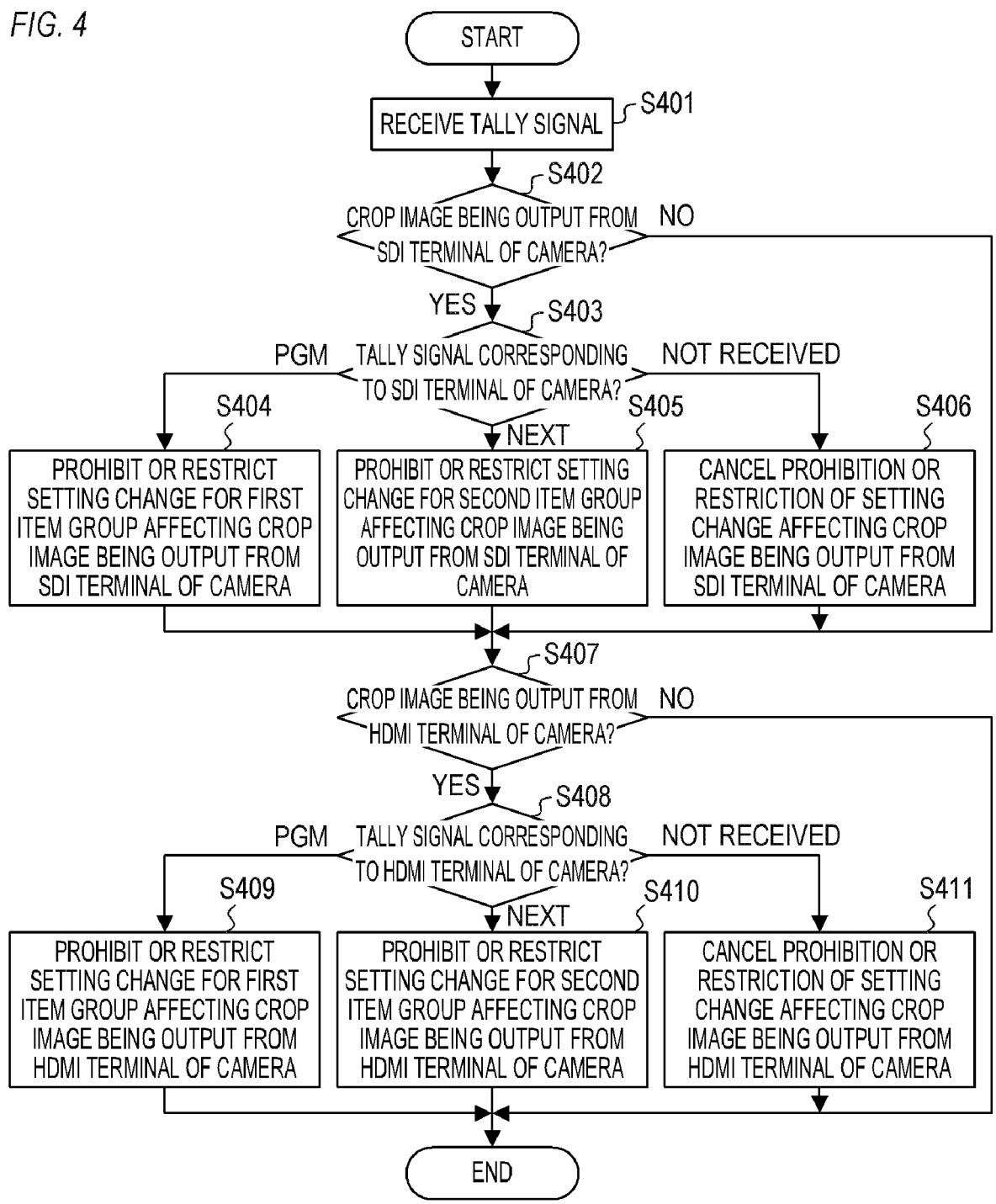
FIG. 4 is a flowchart showing the processing of a controller according to the second embodiment.

FIG. 4 is a flowchart showing the processing of the controller 3000. The processing of FIG. 4 is realized when the system control unit 50 develops a program stored in a non-volatile memory 111 into a system memory 113 and runs the developed program. The processing of FIG. 4 is repeatedly performed at a prescribed cycle after the power of the controller 3000 is turned on, for example, when a user operates a power switch 118.

Note the system control unit 50 has controlled the camera setting transmission/reception unit 3006 to repeatedly receive setting information on an image output from the camera before starting the processing of FIG. 4. The system control unit 50 is capable of determining whether the image output from the camera is a crop image on the basis of the setting information on the image output from the camera.

In S401, the system control unit 50 controls the tally signal reception unit 3005 to receive a tally signal.

In S402, the system control unit 50 determines whether an image (SDI output image) being output from an SDI terminal of the camera is a crop image. When the SDI output image is the crop image, the processing proceeds to S403. Otherwise (when the SDI output image is the whole image or when an image is not being output from the SDI terminal of the camera), the processing proceeds to S407.

In S403, the system control unit 50 determines (confirms) the tally signal corresponding to the SDI terminal (SDI output image) of the camera. When the tally signal corresponding to a PGM output image (the tally signal showing that the SDI output image is the PGM output image) has been received, the processing proceeds to S404. When the tally signal corresponding to a NEXT output image (the tally signal showing that the SDI output image is the NEXT output image) has been received, the processing proceeds to S405. When the tally signal corresponding to the SDI terminal (SDI output image) of the camera has not been received, the processing proceeds to S406.

In S404, the system control unit 50 prohibits or restricts a setting change affecting the crop image (a part of the region of the captured image (input image) of the camera) being output as the SDI output image. The system control unit 50 performs control to prohibit or restrict a setting change for a first item group including at least one item. For example, the system control unit 50 prohibits a change in the position and size of the crop region output from the SDI terminal of the camera, or prohibits movement of an AF position to the outside of the crop region. The system control unit 50 may also prohibit execution of color conversion processing for the crop region output from the SDI terminal of the camera, switching of the crop region output from the SDI terminal, or the like. The system control unit 50 may also restrict a speed for changing the size of the crop region to a speed not more than a prescribed speed. It is possible to change the size of the crop region using the grip zoom 3008. The speed for changing the size of the crop region may be determined according to an operating amount (pressing amount) of the grip zoom 3008. In this case, the system control unit 50 may change the corresponding relationship between the operating amount of the grip zoom 3008 and the speed for changing the size of the crop region, or may prohibit an operation on the grip zoom 3008 beyond at least a prescribed operating amount. As a result, it is possible to restrict the speed for changing the size of the crop region to a speed not more than the prescribed speed. The first item group for which the setting change is prohibited or restricted may include items affecting the whole image (the whole of the region of the captured image (input image) of the camera), besides the items affecting the crop image being output as the SDI output image (the items as described above). For example, the system control unit 50 may prohibit or restrict the PTZ (pan, tilt, and zoom) operation of the camera, a change in the setting of white balance, or the like.

In S405 as well, the system control unit 50 prohibits or restricts a setting change affecting the crop image (a part of the region of the captured image (input image) of the camera) being output as the SDI output image. The system control unit 50 performs control to prohibit or restrict a setting change for a second item group including at least one item. However, the second item group for which the setting change is prohibited or restricted in S405 is different from the first item group for which the setting change is prohibited or restricted in S404. An item group for which a setting change is prohibited or restricted is not particularly limited. However, in the second embodiment, the second item group for which the setting change is prohibited or restricted in S405 is narrower than the first item group for which the setting change is prohibited or restricted in S404. For example, in S404, the system control unit 50 prohibits the movement of the AF position to the outside of the crop region output from the SDI terminal of the camera and the change in the position and size of the crop region. On the other hand, in S405, the system control unit 50 does not prohibit the movement of the AF position to the outside of the crop region output from the SDI terminal of the camera, but prohibits the change in the position and size of the crop region.

Note that the system control unit 50 may provide prescribed notification when the received tally signal corresponds to a specific state. For example, in S405, the system control unit 50 may not prohibit or restrict the setting change affecting the crop image being output as the SDI output image but may display a prescribed alert message on the display unit 110 in response to indication of the setting change by the user.

In S406, the system control unit 50 cancels the prohibition and restriction of the setting change (the prohibition and restriction set in S404 or S405) affecting the crop image being output as the SDI output image. There is a case that the crop image being output as the SDI output image is switched from the PGM output image to the NEXT output image. In this case, the system control unit 50 cancels the limitation and restriction of the setting change for an item for which the setting change is not prohibited or restricted in S405 among the at least one item for which the setting change is prohibited or restricted in S404. There is also a case that the crop image being output as the SDI output image is switched from the NEXT output image to the PGM output image. In this case, the system control unit 50 cancels the prohibition and restriction of the setting change for an item for which the setting change is not prohibited or restricted in S404 among the at least one item for which the setting change is prohibited or restricted in S405.

When the SDI output image is the whole image, both the processing of S404 and the processing of S405 are not performed. Accordingly, when the SDI output image is the whole image, the system control unit 50 does not prohibit or restrict the setting change affecting the crop image even when the tally signal is received.

In S407, the system control unit 50 determines whether an image (HDMI output image) being output from an HDMI terminal of the camera is a crop image. When the HDMI output image is the crop image, the processing proceeds to S408. Otherwise (when the HDMI output image is the whole image or when an image is not being output from the HDMI terminal), the processing of FIG. 4 ends.

In S408, the system control unit 50 determines (confirms) the tally signal corresponding to the HDMI terminal (HDMI output image) of the camera. When the tally signal corresponding to a PGM output image (the tally signal showing that the HDMI output image is the PGM output image) has been received, the processing proceeds to S409. When the tally signal corresponding to a NEXT output image (the tally signal showing that the HDMI output image is the NEXT output image) has been received, the processing proceeds to S410. When the tally signal corresponding to the HDMI terminal (HDMI output image) of the camera has not been received, the processing proceeds to S411.

In S409, the system control unit 50 prohibits or restricts a setting change affecting the crop image (a part of the region of the captured image (input image) of the camera) being output as the HDMI output image. The system control unit 50 performs control to prohibit or restrict a setting change for a first item group including at least one item. For example, the system control unit 50 prohibits a change in the position and size of the crop region output from the HDMI terminal of the camera, or prohibits movement of an AF position to the outside of the crop region. The system control unit 50 may prohibit execution of color conversion processing for the crop region output from the HDMI terminal of the camera, switching of the crop region output from the HDMI terminal of the camera, or the like. The system control unit 50 may also restrict a speed for changing the size of the crop region to a speed not more than a prescribed speed. It is possible to change the size of the crop region using the grip zoom 3008. The speed for changing the size of the crop region may be determined according to an operating amount (pressing amount) of the grip zoom 3008. In this case, the system control unit 50 may change the corresponding relationship between the operating amount of the grip zoom 3008 and the speed for changing the size of the crop region, or may prohibit an operation on the grip zoom 3008 beyond at least a prescribed operating amount. As a result, it is possible to restrict the speed for changing the size of the crop region to a speed not more than the prescribed speed. The first item group for which the setting change is prohibited or restricted may include items affecting the whole image (the whole of the region of the input image), besides the items affecting the crop image being output as the HDMI output image (the items as described above). For example, the system control unit 50 may prohibit or restrict the PTZ (pan, tilt, and zoom) operation of the camera, a change in the setting of white balance, or the like.

In S410 as well, the system control unit 50 prohibits or restricts a setting change affecting the crop image (a part of the region of the captured image (input image) of the camera) being output as the HDMI output image. The system control unit 50 performs control to prohibit or restrict a setting change for a second item group including at least one item. However, the second item group for which the setting change is prohibited or restricted in S410 is different from the first item group for which the setting change is prohibited or restricted in S409. An item group for which a setting change is prohibited or restricted is not particularly limited. However, in the second embodiment, the second item group for which the setting change is prohibited or restricted in S410 is narrower than the first item group for which the setting change is prohibited or restricted in S409. For example, in S409, the system control unit 50 prohibits the movement of the AF position to the outside of the crop region output from the HDMI terminal of the camera and the change in the position and size of the crop region. On the other hand, in S410, the system control unit 50 does not prohibit the movement of the AF position to the outside of the crop region output from the HDMI terminal of the camera, but prohibits the change in the position and size of the crop region.

Note that the system control unit 50 may provide prescribed notification when the received tally signal corresponds to a specific state as described above. For example, in S410, the system control unit 50 may not prohibit or restrict the setting change affecting the crop image being output as the HDMI output image but may display a prescribed alert message on the display unit 110 in response to indication of the setting change by the user.

In S411, the system control unit 50 cancels the prohibition and restriction of the setting change (the prohibition and restriction set in S409 or S410) affecting the crop image being output as the HDMI output image. There is a case that the crop image being output as the HDMI output image is switched from the PGM output image to the NEXT output image. In this case, the system control unit 50 cancels the limitation and restriction of the setting change for an item for which the setting change is not prohibited or restricted in S410 among the at least one item for which the setting change is prohibited or restricted in S409. There is also a case that the crop image being output as the HDMI output image is switched from the NEXT output image to the PGM output image. In this case, the system control unit 50 cancels the prohibition and restriction of the setting change for an item for which the setting change is not prohibited or restricted in S409 among the at least one item for which the setting change is prohibited or restricted in S410.

When the HDMI output image is the whole image, both the processing of S409 and the processing of S410 are not performed. Accordingly, when the HDMI output image is the whole image, the system control unit 50 does not prohibit or restrict the setting change affecting the crop image even when the tally signal is received.

As described above, it is possible to prevent a wrong operation affecting a crop image (a part of the region of an input image) being output as a PGM output image by the processing of the controller according to the second embodiment.

Note that the above various control described as being performed by the system control unit 50 may be performed by at least one hardware (for example, at least one processor and/or at least one circuit). One hardware may control the whole device, or a plurality of hardware may control the whole device by performing processing in a shared fashion.

Further, the embodiments of the present invention are described in detail above. However, the present invention is not limited to these specific embodiments, and also includes various modes without departing from its gist. Moreover, each of the above embodiments only shows one embodiment, and the embodiments may be appropriately combined together.

Further, the above embodiments are described using a case in which the present invention is applied to an imaging device (digital camera) as an example. However, the present invention is not limited to an imaging device and a controller but is applicable to an electronic device so long as a setting change is controllable by the electronic device. For example, the present invention is applicable to personal computers, PDAs, mobile telephone terminals, mobile image viewers, printer devices, digital photo frames, music players, video game machines, and electronic book readers. Further, the present invention is also applicable to video players, display devices (including projection devices), tablet terminals, smart phones, AI speakers, home electric devices, and in-vehicle devices.

According to the present invention, it is possible to prevent a wrong operation affecting a crop image (a part of the region of an input image) being output as a PGM output image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments but is defined by the scope of the following claims.

This application claims the benefit of Japanese Patent Application No. 2022-200131, filed on Dec. 15, 2022, which is hereby incorporated by reference herein in its entirety.

What is claimed is:

1. An electronic device comprising:
   an output interface configured to output an output image corresponding to a whole or a part of a region of an input image;
   a receiver circuit configured to receive a tally signal corresponding to the output image; and
   at least one memory and at least one processor which function as a control unit configured to perform control to prohibit or restrict a setting change affecting the part of the region of the input image in response to reception of the tally signal in a case where the output image corresponds to the part of the region of the input image,
   wherein the tally signal corresponds to any one of a plurality of states, and
   wherein in a case where the output image corresponds to the part of the region of the input image, the control unit performs the control to provide a first notification without performing the control to prohibit or restrict the setting change if the received tally signal corresponds to a specific state.

2. The electronic device according to claim 1, wherein in a case where the output image corresponds to the whole of the region of the input image, the control unit does not perform the control to prohibit or restrict the setting change even if the tally signal is received.

3. The electronic device according to claim 1, wherein the output interface is capable of outputting a plurality of output images corresponding to a plurality of regions of the input image, respectively, and wherein,
   in a case where the plurality of output images are output, the receiver circuit receives a tally signal for at least one of the plurality of output images, and
   the control unit performs control to prohibit or restrict a setting change affecting a region corresponding to the output image for which the tally signal is received among the plurality of regions of the input image.

4. The electronic device according to claim 1, wherein the tally signal corresponds to any one of a plurality of states, and wherein
   in a case where the output image corresponds to the part of the region of the input image, the control unit performs control to prohibit or restrict a setting change for a first item group including at least one item if the received tally signal corresponds to a first state, and performs control to prohibit or restrict a setting change for a second item group including at least one item if the received tally signal corresponds to a second state.

5. The electronic device according to claim 1, wherein the tally signal corresponds to the specific state is a tally signal indicating that the output image is scheduled to be output next.

6. The electronic device according to claim 1, wherein the at least one memory and the at least one processor further function as a setting unit configured to set, according to an instruction from a user, an item for which a setting change is prohibited or restricted in response to the reception of the tally signal in a case where the output image corresponds to the part of the region of the input image.

7. The electronic device according to claim 1, wherein, in a case where performing the control to prohibit or restrict the setting change, the control unit performs control to provide second notification.

8. The electronic device according to claim 1, wherein in a case where the output image corresponds to the part of the region of the input image, the control unit performs control to prohibit or restrict a setting change for an item group including an item affecting the part of the region of the input image and an item affecting the whole of the region of the input image in response to the reception of the tally signal.

9. An electronic device to be connected to an external device, wherein the external device acquires an input image and outputs an output image corresponding to a whole or a part of a region of the input image, the electronic device comprising:
   a receiver circuit configured to receive a tally signal corresponding to the output image; and
   a processor configured to control the external device to prohibit or restrict a setting change affecting the part of the region of the input image in response to reception of the tally signal in a case where the output image corresponds to the part of the region of the input image,
   wherein the tally signal corresponds to any one of a plurality of states, and
   wherein in a case where the output image corresponds to the part of the region of the input image, the control unit performs the control to provide a first notification without performing the control to prohibit or restrict the setting change if the received tally signal corresponds to a specific state.

10. A control method of an electronic device, comprising:
    acquiring an input image;
    outputting an output image corresponding to a whole or a part of a region of an input image;
    receiving a tally signal corresponding to the output image; and
    performing control to prohibit or restrict a setting change affecting the part of the region of the input image in response to reception of the tally signal in a case where the output image corresponds to the part of the region of the input image,
    wherein the tally signal corresponds to any one of a plurality of states, and
    wherein in a case where the output image corresponds to the part of the region of the input image, the control is performed to provide a first notification without performing the control to prohibit or restrict the setting change if the received tally signal corresponds to a specific state.

11. A control method of an electronic device to be connected to an external device, wherein the external device acquires an input image and outputs an output image corresponding to a whole or a part of a region of the input image, the control method comprising:
    receiving a tally signal corresponding to the output image; and
    performing control of the external device to prohibit or restrict a setting change affecting the part of the region of the input image in response to reception of the tally signal in a case where the output image corresponds to the part of the region of the input image,
    wherein the tally signal corresponds to any one of a plurality of states, and
    wherein in a case where the output image corresponds to the part of the region of the input image, the control is performed to provide a first notification without performing the control to prohibit or restrict the setting change if the received tally signal corresponds to a specific state.

12. A non-transitory computer readable medium that stores a program, wherein the program causes a computer to execute a control method of an electronic device, the control method comprising:
    acquiring an input image;
    outputting an output image corresponding to a whole or a part of a region of an input image;
    receiving a tally signal corresponding to the output image; and
    performing control to prohibit or restrict a setting change affecting the part of the region of the input image in response to reception of the tally signal in a case where the output image corresponds to the part of the region of the input image,
    wherein the tally signal corresponds to any one of a plurality of states, and
    wherein in a case where the output image corresponds to the part of the region of the input image, the control is performed to provide a first notification without performing the control to prohibit or restrict the setting change if the received tally signal corresponds to a specific state.

13. A non-transitory computer readable medium that stores a program, wherein the program causes a computer to execute a control method of an electronic device to be connected to an external device, wherein the external device acquires an input image and outputs an output image corresponding to a whole or a part of a region of the input image, the control method comprising:
    receiving a tally signal corresponding to the output image; and
    performing control of the external device to prohibit or restrict a setting change affecting the part of the region of the input image in response to reception of the tally signal in a case where the output image corresponds to the part of the region of the input image,
    wherein the tally signal corresponds to any one of a plurality of states, and
    wherein in a case where the output image corresponds to the part of the region of the input image, the control is performed to provide a first notification without performing the control to prohibit or restrict the setting change if the received tally signal corresponds to a specific state.

* * * * *